United States Patent

Sakai

[11] Patent Number: 6,137,752
[45] Date of Patent: Oct. 24, 2000

[54] OPTICAL PICKUP DEVICE

[75] Inventor: Hiroshi Sakai, Suwon, Rep. of Korea

[73] Assignee: Samsung Electro-Mechanics Co., Ltd., Suwon, Rep. of Korea

[21] Appl. No.: 09/170,665

[22] Filed: Oct. 13, 1998

[30] Foreign Application Priority Data

Oct. 20, 1997 [KR] Rep. of Korea ...................... 97-53685

[51] Int. Cl.$^7$ ...................................... G11B 7/00
[52] U.S. Cl. ....................... 369/44.23; 369/112
[58] Field of Search .............................. 369/44.11, 44.14, 369/44.23, 44.37, 44.41, 103, 109, 112, 120

[56] References Cited

U.S. PATENT DOCUMENTS 4,731,772  3/1988  Lee .

FOREIGN PATENT DOCUMENTS

6313134  1/1988  Japan .
287336   3/1990  Japan .
6101138  12/1994 Japan .

*Primary Examiner*—Paul W. Huber
*Attorney, Agent, or Firm*—Ladas & Parry

[57] ABSTRACT

An optical pickup device used for optical information processing instruments includes a light source for emitting an outgoing light toward a recording medium, a diffraction grating for separating the outgoing light from the light source into a main beam and at least two sub-beams, an objective lens for independently focusing the main beam and sub-beams separated via the diffraction grating on the recording medium, a hologram formed by areas divided into $2^{n+1}$ for dividing a reflected light having passed through the objective lens after being reflected by the recording medium into a first diffracted beam and a second diffracted beam having different focusing distances from each other to diffract the first and second diffracted beams to one direction of the outgoing light axis of the light source, and a single photodetector having a first light receiving element divided-by-three for accepting the first diffracted beam and a second light receiving element divided-by-three for accepting the second diffracted beam to detect a focus error signal, thereby accurately detecting the focus error signal with only one photodetector without involving variation.

18 Claims, 10 Drawing Sheets

——: diffracted beam of reference wavelength
-----: diffracted beam in case of long wavelength
Δd: moved distance of beam by wavelength varuation

FIG. 10

——: diffracted beam when objective lens is centered
-----: diffracted beam when objective lens is in the inner circumference of disc

FIG.11

OPTICAL PICKUP DEVICE

BACKGROUND OF THE INVENTION

1. Field of the Invention

The present invention relates to an optical pickup device used for optical information processing instruments such as CDROMs and DVDs, and more particularly to an optical pickup device having a structure for detecting a stable focus error signal free from the wavelength variation and positional variation of tracks of an objective lens to therefore provide a stable recording signal while involving less positional variation of optical parts and less degraded signal characteristics.

2. Description of the Prior Art

A hologram head which is employed as an optical head provided by simplifying a conventional optical system has been suggested in Japanese Patent Laid-open Publication No. sho63-229640.

Figure 1:
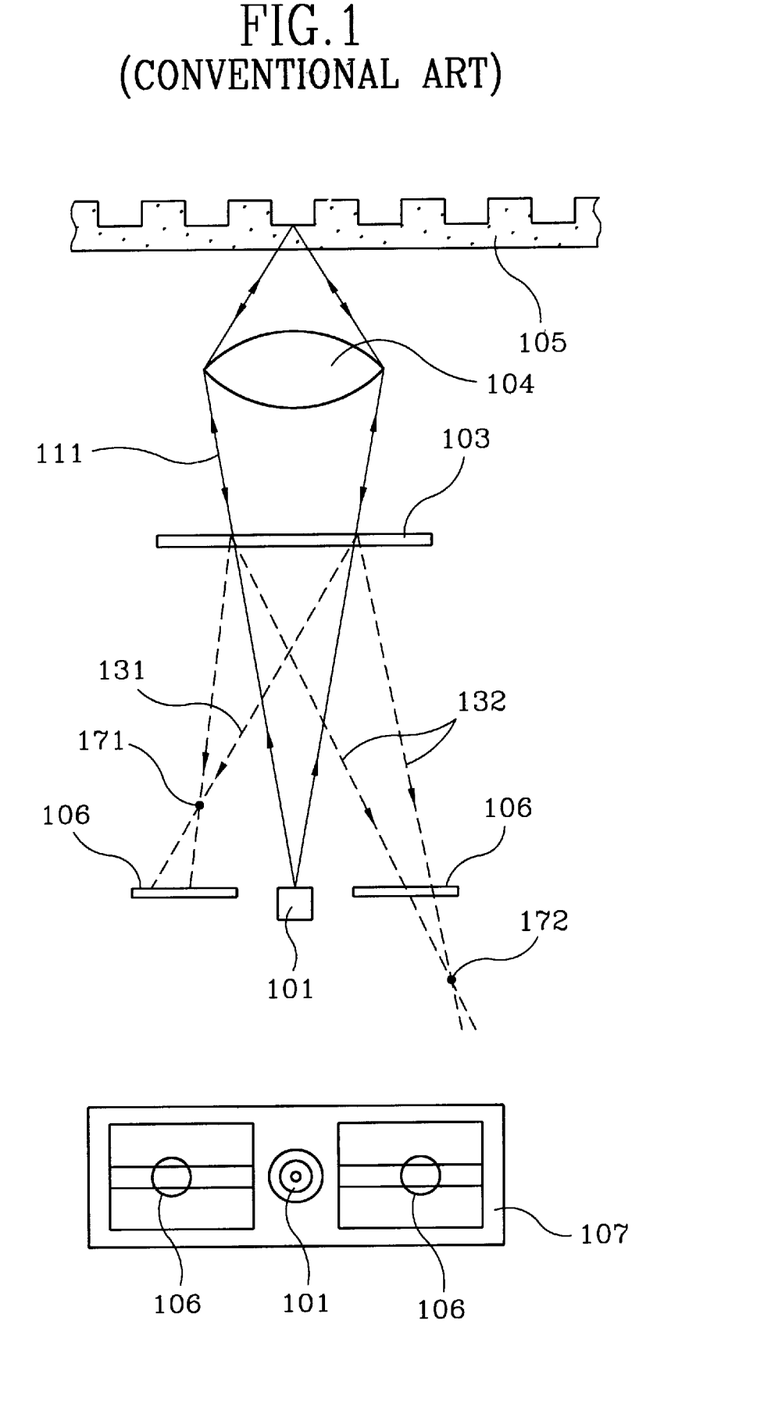
FIG. 1 shows a construction of a conventional optical pickup device.

In the hologram head as shown in FIG. 1, once a laser beam 111 is radiated from a light source 101 being a semiconductor laser, beam 111 transmits through a hologram 103 and then is incident to an objective lens 104. At this time, beam 111 transmitted through hologram 103 is divided into a zero order beam +first order beam and −first order beam. Among these beams, the zero order beam is to be solely utilized.

The beam having passed through objective lens 104 reaches an information recording/reproducing plane of a disc 105 to form a focus of light, and reflected beam reflected from disc 105 again transmits through objective lens 104 to be incident to hologram 103. The −first order diffracted beam 131 and +first order diffracted beam 132 diffracted by hologram 103 are respectively incident to two photodetectors 106 which are arranged in the vicinity of light source 101.

Photodetectors 106 are placed on a photodetector stand 107, of which rotation is adjustable.

Here, the reflected beam having passed through hologram 103 is in the form of having two conjugate focuses 171 and 172 that are placed at the front and rear sides of light source 101 with respect to the optical axis direction.

Figure 2A:
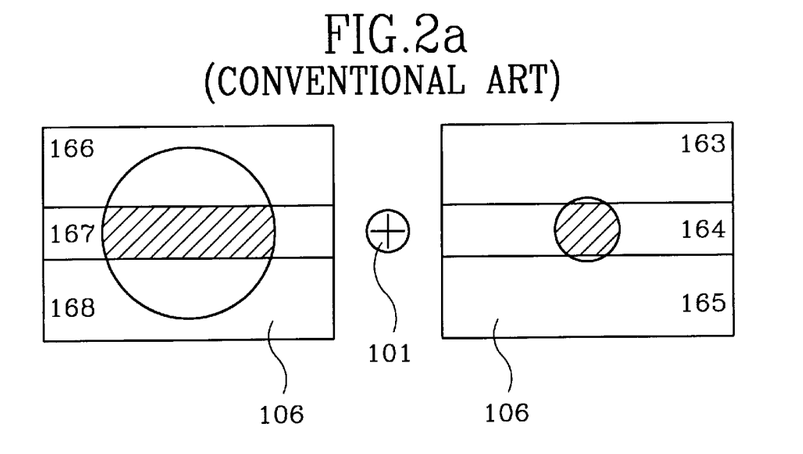
FIGS. 2a to 2c show states of diffracted beams accepted to photodetectors of the conventional optical pickup device.

In other words, −first order diffracted beam 131 and +first order diffracted beam 132 reaching left and right photodetectors 106 are set to focus on spots provided further before or after respective photodetectors 106, which will be described in more detail with reference to FIGS. 2a, 2b and 2c.

Figure 2B:
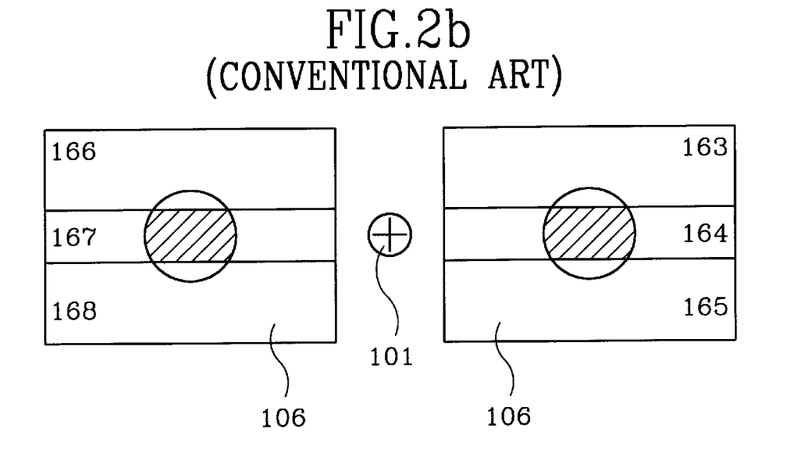
Figure 2C:
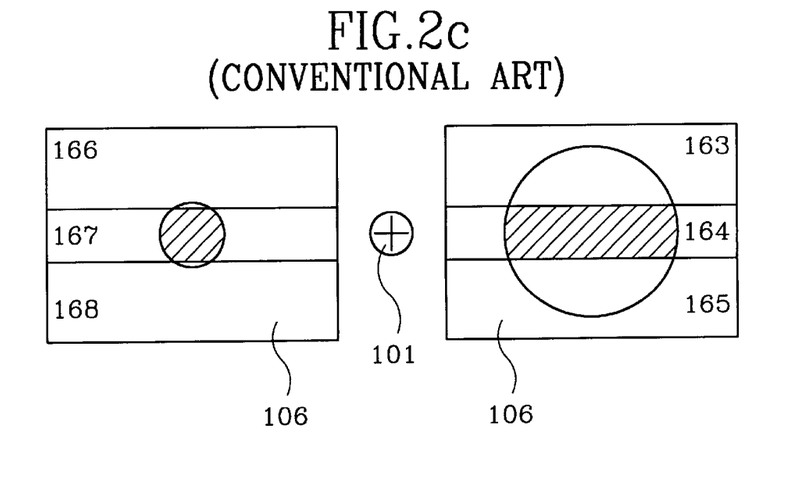

When the information recording/reproducing plane of disc 105 is timely placed to the focus point of objective lens 104, as shown in FIG. 2b, left and right diffracted beams 131 and 132 exactly focus on their own positions, respectively. Accordingly, the diameters of diffracted beams 131 and 132 detected by photodetectors 106 are of the same size.

Also, when the information recording/reproducing plane, i.e., disc 105, is distant from objective lens 104, as shown in FIG. 2a, the diameter of left diffracted beam 131 detected by left photodetector 106 is increased in size while that of right diffracted beam 132 is decreased.

Contrarily, when the information recording/reproducing plane, i.e., disc 105, gets nearer to objective lens 104, the diameter of left diffracted beam 131 is decreased in size, and that of right diffracted beam 132 is increased.

Therefore, The focusing state between objective lens 104 and disc 105 can be perceived in view of the quantity of light of the diffracted beams accepted within light receiving areas 163 to 168 of both left and right photodetectors 106. Assuming that such a focus error value is denoted by Fe, Fe can be defined by a value which is obtained by subtracting the quantity of light accepted by light receiving element 164 from that accepted by light receiving element 167. That is, it is written as Fe=167−164 where 167 denotes the quantity of light accepted by light receiving element 167 and 164 denotes that accepted by light receiving element 164. Otherwise, the focus error value Fe can be given as the equation that Fe=(163+165+167)−(164+166+168).

Hologram 103 allows the focus of the diffracted beam to be formed onto any other place from that of the zero order beam when diffracting the beams radiated from light source 101. For this fact, unnecessary focusing on the information recording/reproducing plane is not performed when conducting the recording/reproducing operation to nor insert/record unnecessary playback signal.

In connection with the variation of the diffraction angle resulting from the wavelength difference of light source 101 in the above-described conventional structure, photodetectors 164 and 167 parallel to light source 101 in the radiating direction are employed. For this reason, the laser beam is moved along with the division direction even in the case of producing the wavelength variation, so that the structure hardly induces variation in the focus error signal, etc. However, due to this fact, it is disadvantageous as below.

First, because conventional hologram 103 is provided in a manner to have two conjugate focuses 171 and 172 on both sides of light source 101, the photodetectors are respectively required on both sides of light source 101 to interpose it between them.

Consequently, in the conventional structure, two photodetectors 106 are to be manufactured to make fixing of them onto photodetector stand 107 greatly fastidious because of the precisely symmetrical installation on the identical places. According to circumstances, it may be formed such that a large silicon substrate is perforated to prepare the light source in the hole formed. But this way has a problem of significantly heightening unit cost of the silicon substrate and, furthermore, requiring a new technique (Hybrid facilities) for fixedly installing the light source onto the center of the integrated photodetector.

Second, since conventional hologram 103 has two conjugate focuses 171 and 172 by −first order diffracted beam 131 and +first order diffracted beam 132, the optical axis-oriented distance from hologram 103 to reaching both photodetectors 106 should be always the same relative to the optical axis-oriented distance from hologram 103 to light source 101 so as to set two conjugate focuses 171 and 172 onto before and after the optical axis direction with respect to light source 101. Thus, it is very difficult to change in designing the distance relation among hologram 103, light source 101 and photodetectors 106.

On the other hand, Japanese Patent Laid-open Publication No. sho63-13134 describes another prior art of using the hologram.

Figure 3A:
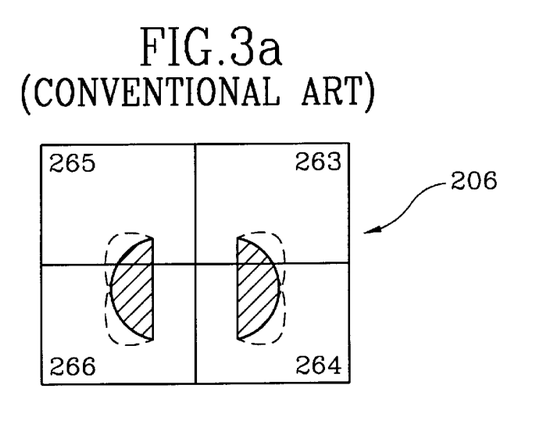
FIGS. 3a to 3c show states of diffracted beams accepted to photodetectors of another conventional optical pickup device.
Figure 3B:
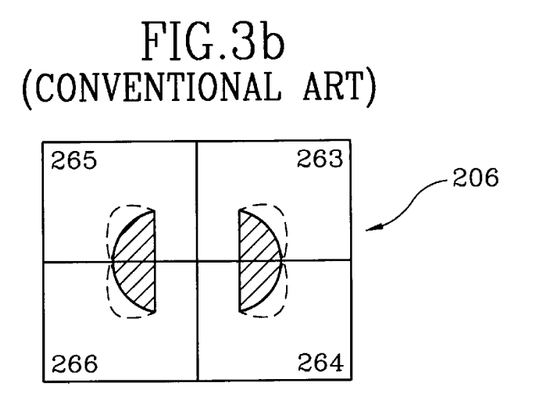
Figure 3C:
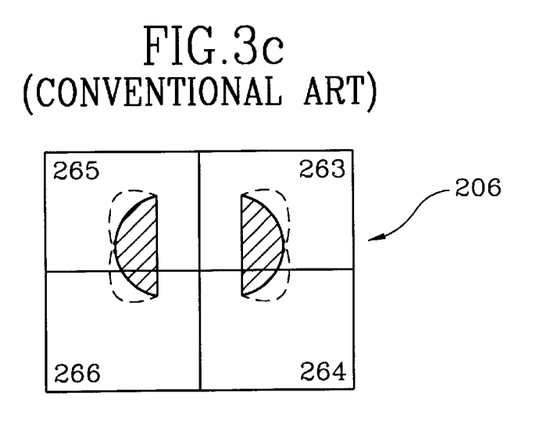

The art is for detecting a focus error by astigmatism. As shown in FIGS. 3a, 3b and 3c, a focus error signal Fe is detected as follows by means of a photodetector 206 divided-by-four, $$Fe=(263+266)-(264+265)$$

In this optical system, the beam is placed onto the center of photodetector 206 as shown in FIG. 3b when the objective lens is centrally arranged. However, if the objective lens is moved toward the inner circumference of the disc while moving from the center by tracing the tracks, the position of the beam is moved to the lower side of the center line of photodetector 206 as designated in FIG. 3a. Besides, when the objective lens is moved toward the outer circumference of the disc, the position of the beam is moved to the upper side of the center line of photodetector 206 as designated in FIG. 3c. Hence, when the objective lens is placed other than the center, the focus error signal involves variation as well as the sensitivity is changed.

SUMMARY OF THE INVENTION

The present invention is devised to solve the foregoing conventional problems. Therefore, it is an object of the present invention to provide an optical pickup device for diffracting two diffracted beams having mutually different focusing distances toward one direction of a light source to permit them to be accepted to a single photodetector, thereby being capable of detecting a focus error signal without involving variation.

It is another object of the present invention to provide an optical pickup device having a hologram for producing two diffracted beams with respectively different focus powers, thereby enabling free change in designing within the range of causing no great difference in the relative positional relation among the hologram, a light source and a photodetector.

To achieve the above object of the present invention, the hologram of the optical pickup device according to the present invention is formed by, after four areas are provided by being partitioned into four by means of a division line parallel to the train of tracks of a disc which is a recording medium and a division line intersecting to be perpendicular to the division line, making two pairs of diagonally-opposing areas have the same diffraction angle and diffracting focus. In this structure, it is characterized in that reflected light reflected from the disc is separated into a first diffracted beam and a second diffracted beam to allow them to respectively focus on the front and rear sides of a photodetector.

In addition, the photodetector of the present invention for accepting the first diffracted beam and second diffracted beam is constructed by light receiving elements divided by two by means of a division line in parallel with the direction of the train of pits and then divided by at least three in the direction in parallel with the direction of the train of tracks. By this structure, even when the objective lens is horizontally moved from the center toward the inner circumference or outer circumference of the disc, the position of the beam accepted to the light receiving elements of the photodetector is moved along the division line to thus detect the focus error signal without involving variation and inhibiting the change of sensitivity.

That is, the focus error signal detection carried out by the optical pickup device according to the present invention is characterized by inciting no deviation in the focus error signal even when the photodetector has a fine positional variation or the hologram has a rotational position variation.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

The preferred embodiments of an optical pickup device according to the present invention will be described with reference to accompanying drawings.

Figure 4:
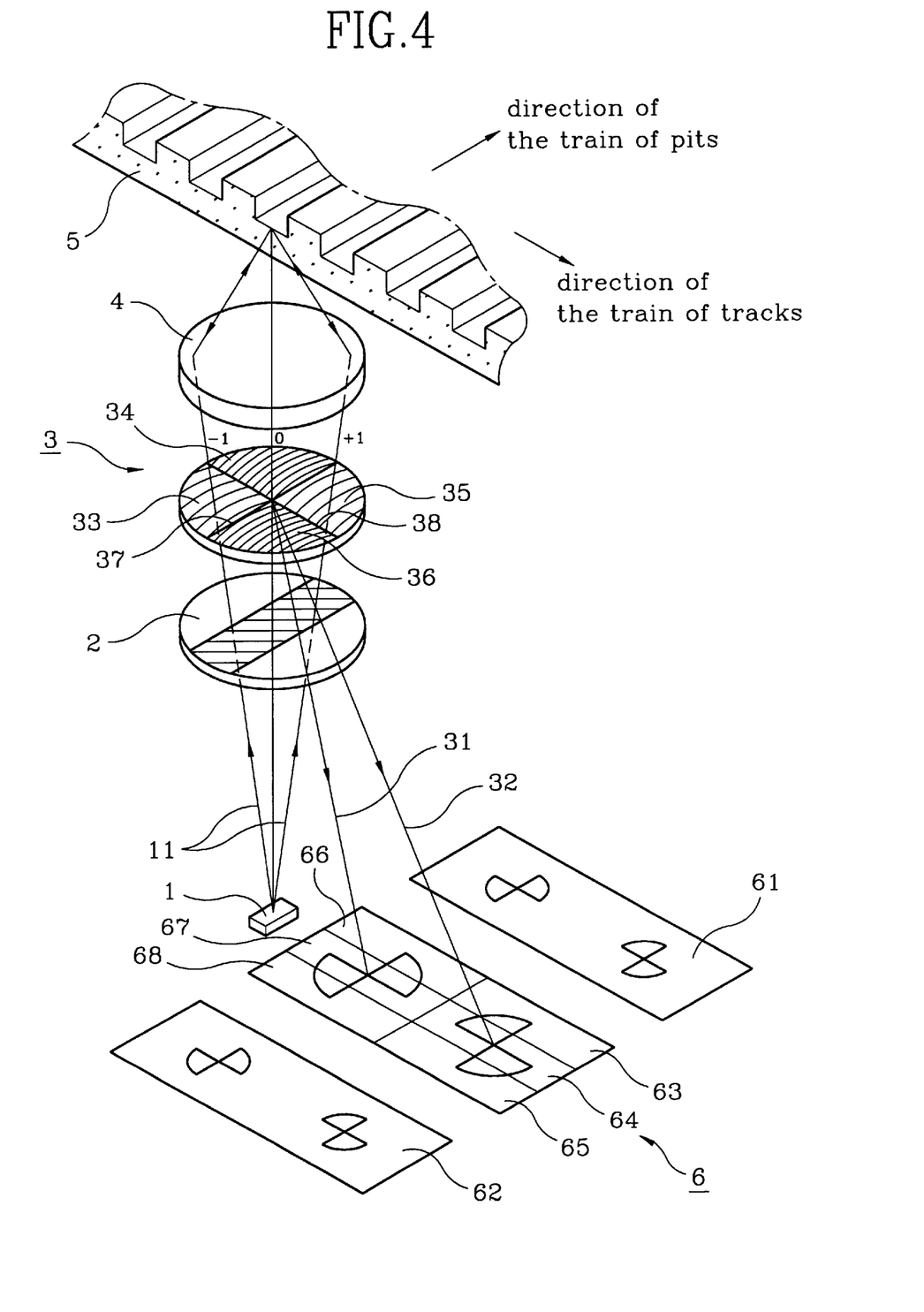
FIG. 4 is a perspective view showing the major parts of an optical pickup device according to the present invention.

In FIG. 4, a light source 1 utilizes a general semiconductor laser. Beams 11 emitted from light source 1 pass through a diffraction grating 2 for tracking detection to be separated into zero order beam and +first order beams, which then pass through a hologram 3.

Even after passing through the hologram, the beams are also separated into the zero order beam and +first order beams. Among these, the zero order beam is used. Thereafter, beam 11 focuses on an information recording plane of a disc 5 by means of an objective lens 4, and a reflected beam reflected by the information recording plane again passes through objective lens 4 to be incident to hologram 3.

Here, a first diffracted beam 31 and a second diffracted beam 32 are formed by hologram 3, which then reach a photodetector 6 divided-by-eight placed adjacently to light source 1. Photodetector 6 consists of eight-divided elements 61, 62, 63, 64, 65, 66, 67 and 68, which are illustrated to be larger than the actual size in the drawing for facilitating the understanding.

Hologram 3 has two focuses by respective areas which have diffracting forces different from each other.

Figure 5:
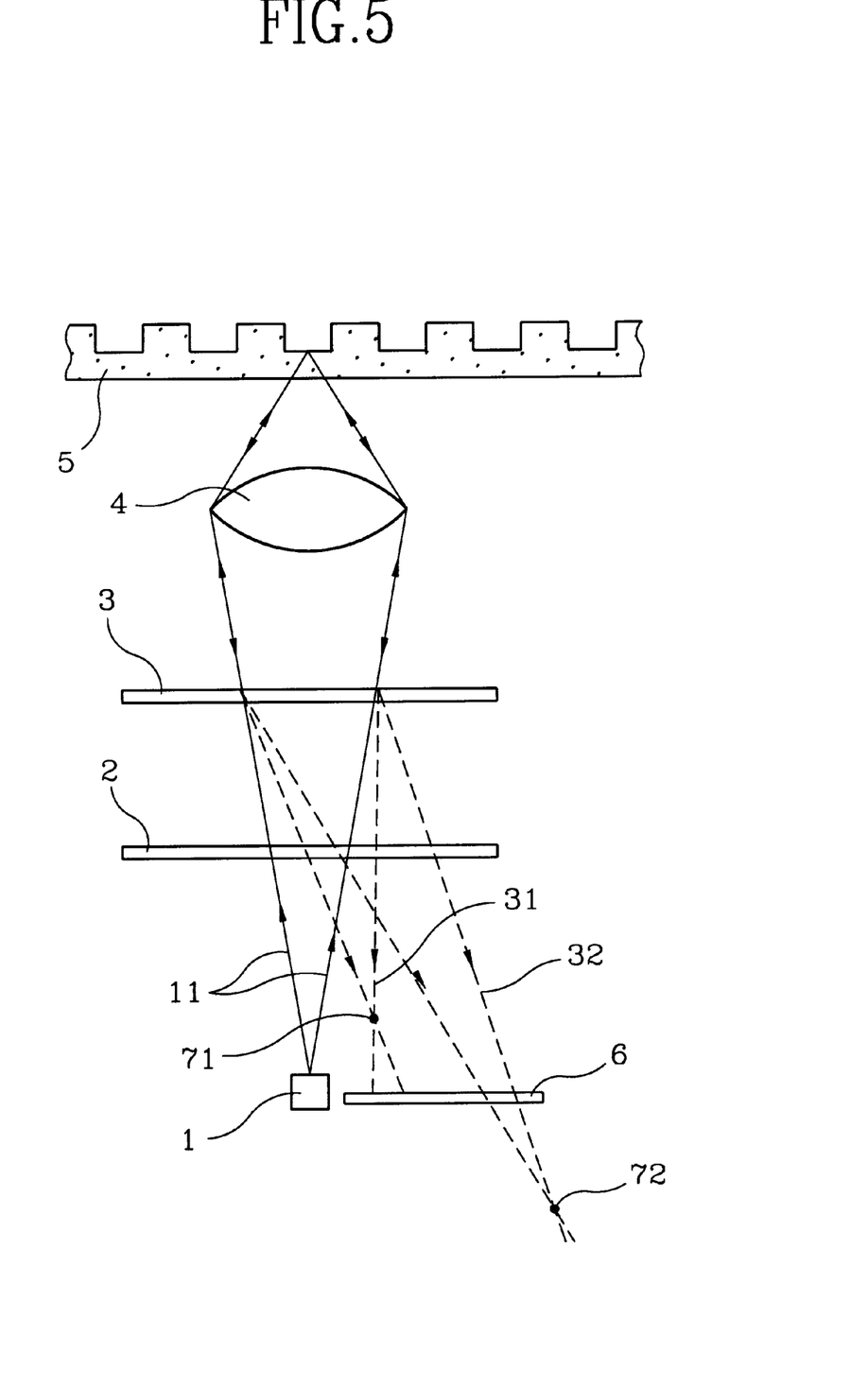
FIG. 5 is a front view showing the major parts of the optical pickup device according to the present invention.

In other words, as shown in FIGS. 4 and 5, areas 33 and 35 of hologram 3 form a lattice pattern equivalent to interference strips of a spherical wave plane which proceeds light source 1 and two spherical wave planes which proceeds the front plane of element 67 of the photodetector divided-by-eight. By this lattice pattern, first diffracted beam 31 is generated. Similarly, remaining areas 34 and 36 of hologram 3 form a lattice pattern equivalent to interference strips of a spherical wave plane which proceeds semiconductor laser light source 1 and two spherical wave planes which proceed the rear plane of element 64 of the photodetector divided-by-eight. This lattice pattern produces second diffracted beam 32. These lattice patterns are illustrated to be larger than the actual size in FIG. 4 for facilitating the understanding.

Among the division lines for equally partitioning hologram 3 into areas 33, 34, 35 and 36, one division line 37 becomes in parallel with the direction of the train of tracks of disc 5 while going through the center point of hologram 3. Also, another division line 38 becomes in parallel with the direction of the train of tracks of disc 5 while going through the center point of hologram 3, and is parallel with respect to the direction of connecting light source 1 and photodetector 6. Thus, division line 38 perpendicularly intersects division line 37 along the axis of light.

Figure 6:
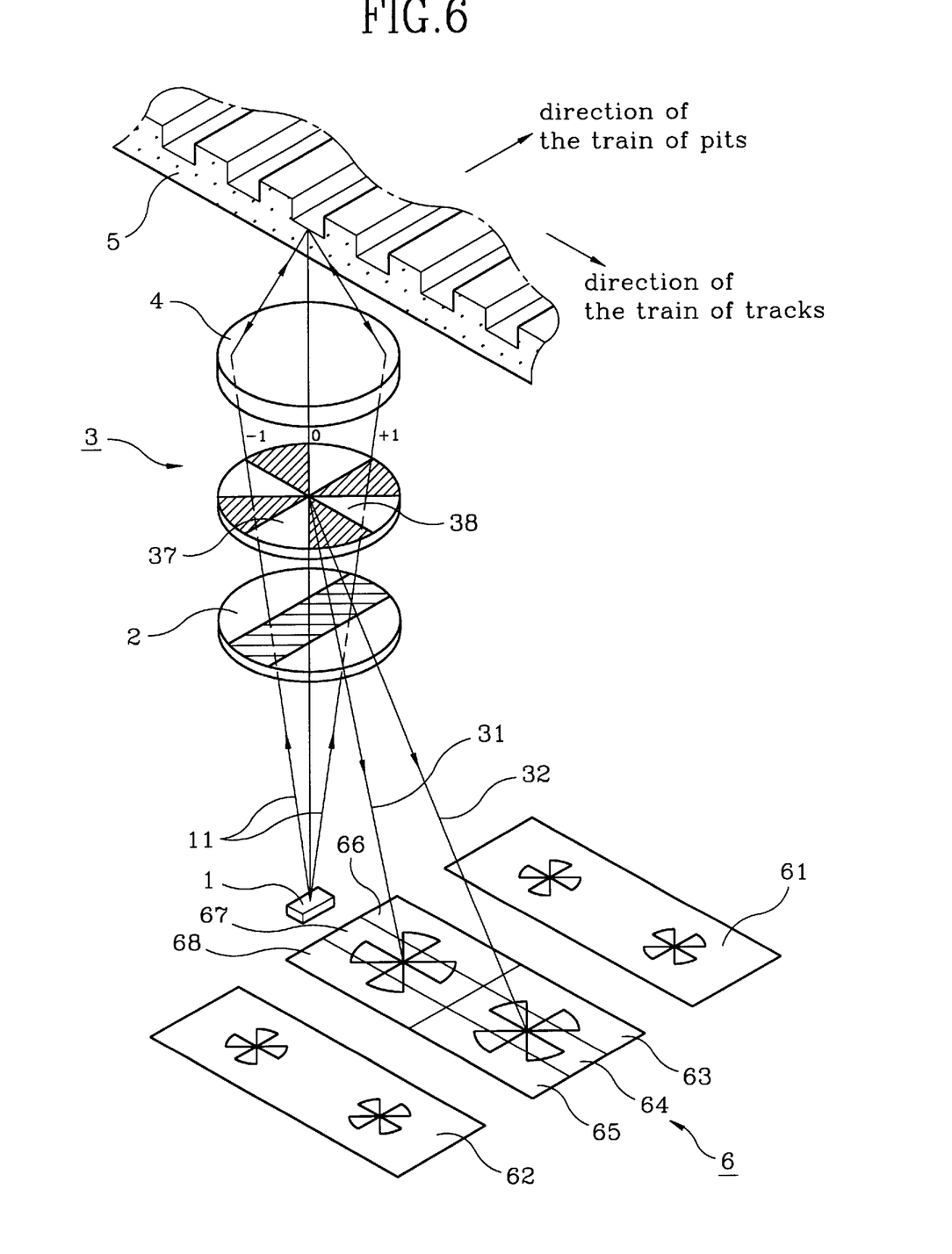
FIG. 6 is a perspective view showing another embodiment of the hologram according to the present invention.

Hologram 3 according to the present invention is equally partitioned into a plurality of areas in such a manner to be partitioned into four, eight or more by the plurality of division lines that go through the center point of hologram 3. More specifically, after equally dividing hologram 3 into $2^{+1}$-numbered sector areas by first division line 38 in the direction parallel to the train of tracks and $2^n$-numbered division lines which number at least two by including first division line 38, first diffracted beam 31 can be diffracted by every other $2^n$ area alternately arranged among $2^{n+1}$ sector areas. Also, second diffracted beam 32 is to be diffracted by remaining every other $2^1$ area arranged between them. This formation can be easily understood with reference to FIG(S) 4 and/or 6.

For example, hologram 3 shown in FIG. 6 is obtained by dividing the hologram area by eight by means of four division lines including first division line 38, i.e., value n is set to 2 (where $2^{n+1}=8$). Among these areas, first diffracted beam 31 or second diffracted beam 32 can be generated by partitioning into the oblique-lined areas and blank areas.

As shown in FIG. 5, the lattice pattern of hologram 3 according to this embodiment is provided to form a focus 71 at the front side before first diffracted beam 31 diffracted nearer to light source 1 reaches photodetector 6 and form a focus 72 at the rear side after second diffracted beam 32 distant from light source 1 passes through photodetector 6.

By fabricating hologram 3 to form respective focuses 71 and 72 of first diffracted beam 31 and second diffracted beam 32 as shown in FIG. 5, a focusing distance of second diffracted beam 32 remotely provided from light source 1 becomes naturally lengthened by the great diffraction force as compared with the focusing distance of first diffracted beam 31 closely placed to light source 1 by the relatively smaller diffraction force.

Figure 7:
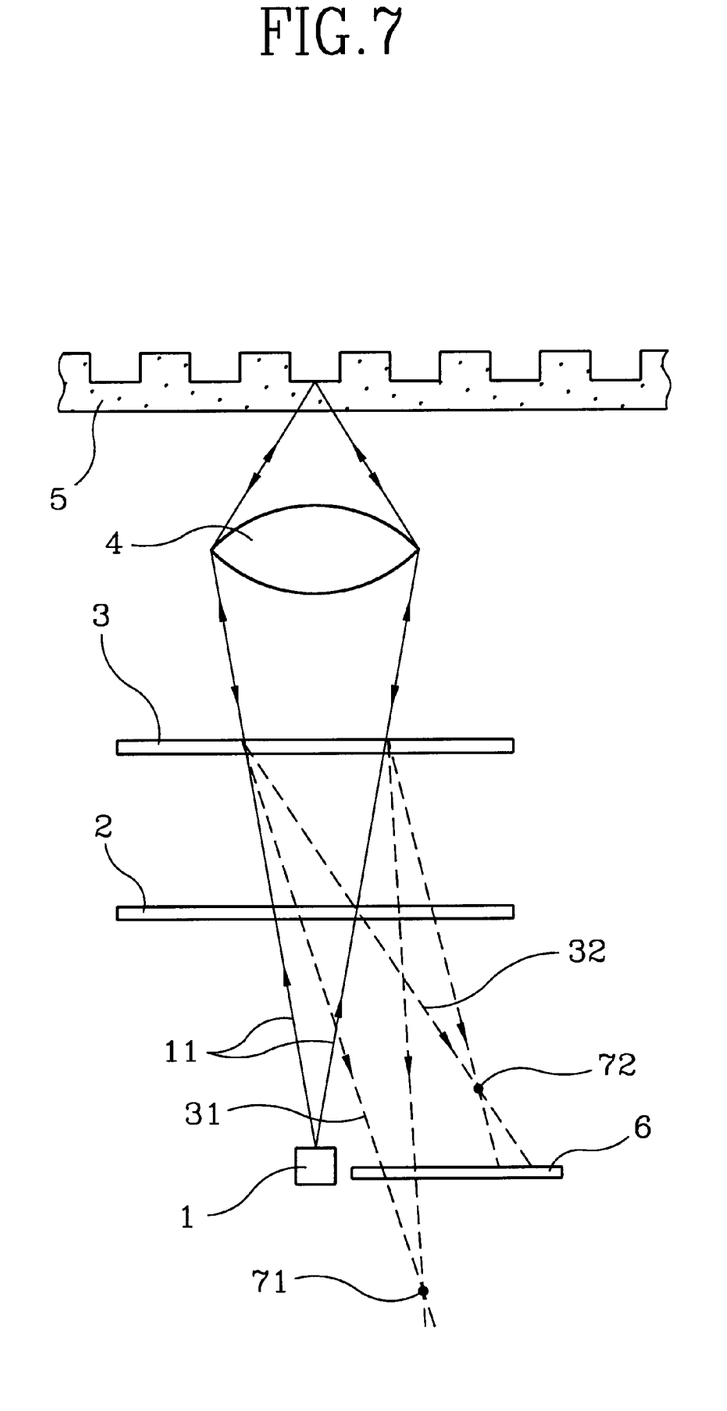
FIG. 7 is a front view showing another embodiment of the present invention.

Therefore, it is easier to be fabricated when the pitch of the lattice pattern of hologram 3 shown in FIG. 5 is relatively widened that the contrary case of respective focusing positions of FIG. 5; that is, than the case of forming the lattice pattern of hologram 3 as shown in FIG. 7 in which focus 71 is formed at the rear side after first diffracted beam 31 diffracted toward the nearer side of light source 1 passes through photodetector 6 and focus 72 is formed at the front side before remotely-provided second diffracted beam 32 reaches photodetector 6.

In more detail, as shown in FIG. 7, the present invention may be embodied as focus 72 of second diffracted beam 32 is formed on the place before reaching photodetector 6 where focus 71 of first diffracted beam 31 passes through photodetector 6. However, the case illustrated in FIG. 5 is more preferable in forming the hologram pattern.

Again referring to FIGS. 4 and 5, first diffracted beam 31 diffracted from hologram areas 33 and 35 which are of the diagonally-opposite areas sectioned by two division lines 37 and 38 forms focus 71 at the front side of element 67 of photodetector 6 of FIG. 5, and then diverges again to reach over photodetectors 66, 67 and 68.

Since second diffracted beam 32 diffracted from hologram areas 34 and 36 forms focus 72 at the rear side of photodetector 11 /2 element 64, it reaches over photodetector elements 63, 64 and 65 while converging.

Photodetector elements 61 and 62 are for detecting 3-beam tracking sub-beams. That is, photodetector elements 61 and 62 are for track error detecting elements, and photodetector elements 63, 64, 65, 66, 67 and 68 are used for detecting the focus error.

Hereinbelow, the focus error signal detection will be described.

Figure 8A:
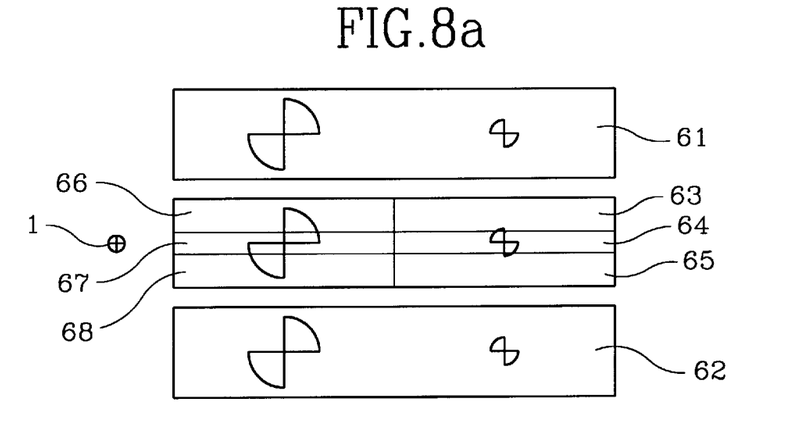
FIGS. 8a to 8c show states of the diffracted beams accepted to the photodetector of the optical pickup device according to the present invention.
Figure 8B:
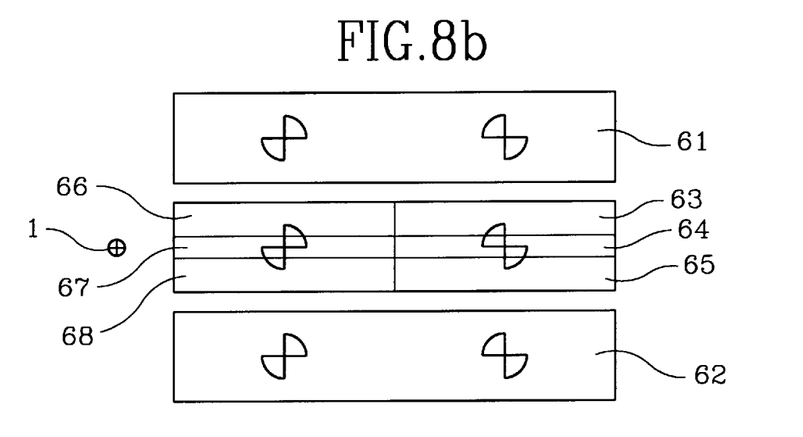
Figure 8C:
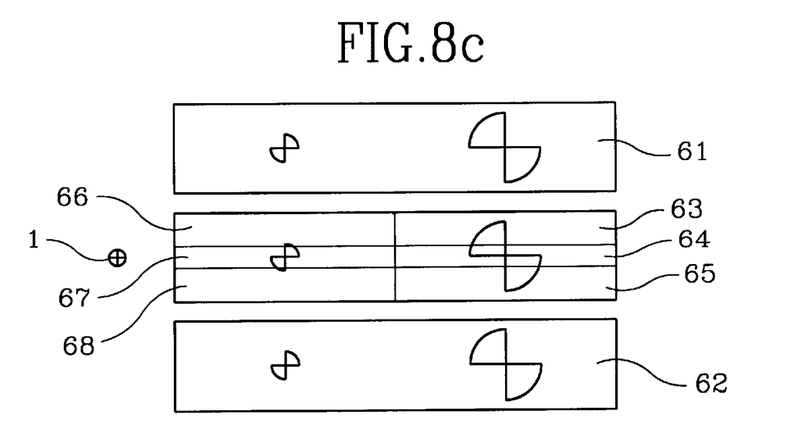

FIG. 8b shows the light receiving states of first diffracted beam 31 and second diffracted beam 32 on photodetector 6 in the left and right when the focus of the beam is precisely formed on disc 5. Here, two diffracted beams are symmetrical with respect to the division line that divides photodetector 6 into a first light receiving element consisting of 3-divided light receiving elements 63, 64 and 65 and a second light receiving element consisting of 3-divided light receiving elements 66, 67 and 68. Besides, the states of first diffracted beam 31 and second diffracted beam 32 accepted to photodetector 6 diffracted by hologram 3 are respectively illustrated when the focus is blurred due to the approaching between disc 5 and objective lens 4 as shown in FIG. 8a and when the focus is blurred due to the distancing between disc 5 and objective lens 4 as shown in FIG. 8c.

Accordingly, a focus error signal Fe can be given by a value obtained by subtracting the quantity of light of light receiving element 67 from the quantity of light of light receiving element 64. In other words, it is written that Fe=64−67 where 64 denotes the quantity of light of light receiving element 64 and 67 denotes the quantity of light of light receiving element 67. Otherwise, focus error value Fe can be defined by an equation that Fe=(64+66+68)−(63+65+67).

In this embodiment, it is preferable that hologram 3 is formed to have a structure of which rotation is adjustable as consistently distributing the quantity of the light of beam to respective photodetector elements so as to allow the focus error signal to be a zero cross point when the focus of the beam is formed.

Now, the track error signal detection will be described.

A track error signal Te is detected via a 3-beam method typically employed in the optical pickup field.

Beam 11 emitted from light source 1 is incident to diffraction grating 2, and then diffracted as zero order beam and +first order beams. Here, +first order beams are used for track error signal.

After having passed through hologram 3 and objective lens 4, the ± first order beams focusing on another place of being interposed with the zero order beam on the information recording plane of disc 5 is reflected to be diffracted from hologram 3 after passing through objective lens 4, thereby reaching elements 61 and 62 of photodetector 6.

At this time, track error signal Te can be obtained by subtracting 62 from 61 in such a manner that the focuses of the +first order beam and −first order beam on the information recording plane of disc 5 are placed on spots of the tracks of respectively forming +90° and −90° with respect to the tracing tracks.

Furthermore, a playback signal Rf can be detected by the total sum of six elements for detecting the focus error signal of photodetector 6. That is, Rf=63+64+65+66+67+68.

Meantime, because the focus error detecting optical system using hologram 3 has an diffraction angle differed with respect to the variation of the wavelength of the light source, the position of the diffracted beam reaching the photodetector may be deviated due to the differed diffraction angle. As the result, the ratio of quantity of light or area ratio over respective photodetector elements may be changed to induce a focus variation, which, however, can be solved as below in the present invention.

More specifically, the diffracting direction of first diffracted beam 31 and second diffracted beam 32 of hologram 3 has the diffraction angle diffracted in the direction parallel to the train of tracks at one side of light source 1, and the element division lines in photodetector 6 are also parallel to the train of tracks as the diffracting direction. Due to this fact, even if the positions of diffracted beams 31 and 32 are changed, they are unavoidably moved along the division lines of photodetector 6. Consequently, the ratio of quantity of light or area ratio reaching respective elements of photodetector 6 is not changed to cause no problem.

Figure 9:
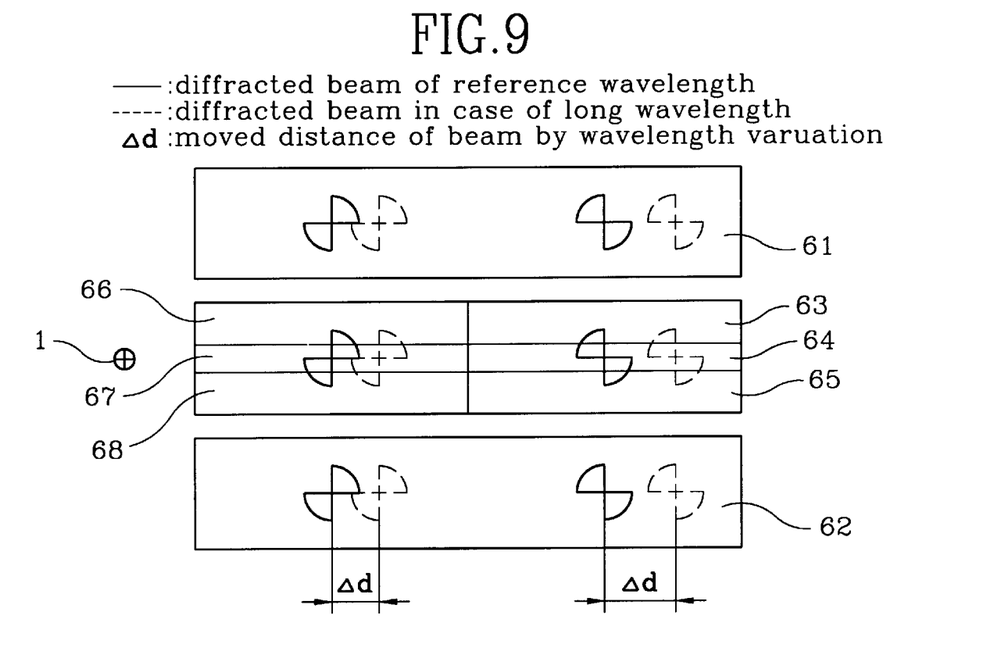
FIG. 9 is a plan view showing the photodetector for explaining the focus movement state of the diffracted beam across the photodetector resulting from the wavelength variation in the optical pickup device according to the present invention.

When the wavelength is changed toward the long wavelength rather than that of the reference light as stated above, the pattern of the diffracted beams moved to the direction remotely distanced from the light source along the division lines of the photodetector is illustrated in FIG. 9.

Also, if objective lens 4 is deviated from the center of disc 5 while tracing the information recording track on disc 5, the positions of the diffracted beams reaching respective elements of the photodetector may be moved or deviated.

As the result, a problem of changing the ratio of quantity of light or area ratio presented over respective elements of the photodetector to produce the focus variation liably occurs, which, however, can be solved in the present invention as follows.

Figure 10:
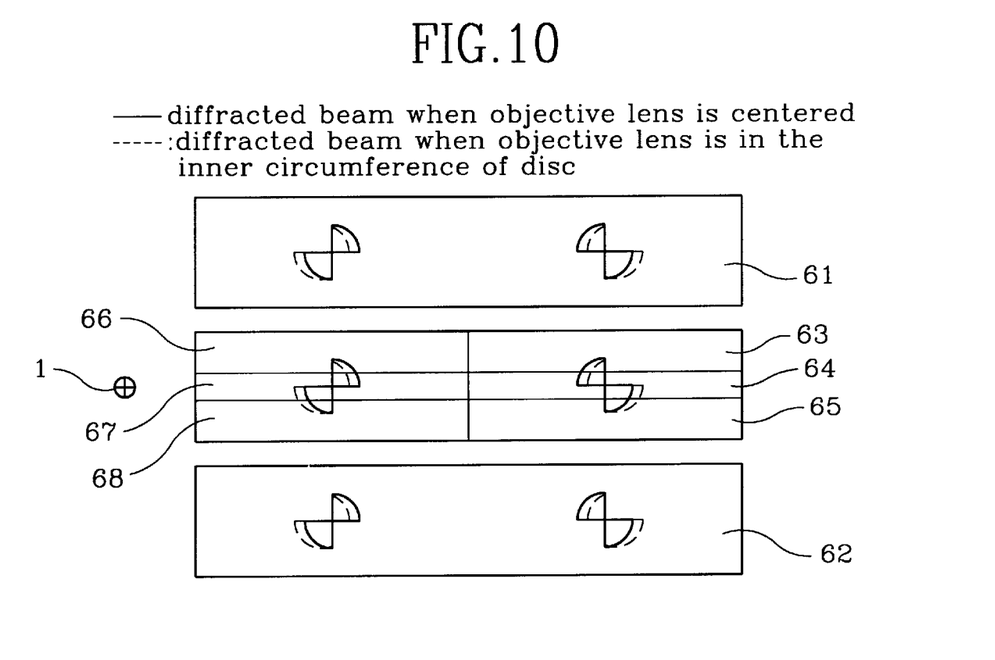
FIG. 10 is a plan view showing the photodetector for explaining the state of the diffracted beam resulting from the positional change of the objective lens with respect to the disc in the optical pickup device according to the present invention.

That is, the movement of beam over hologram 3 incited by the deviation of objective lens 4 is conducted along division line 38. Accordingly, the light-use area of hologram areas 33 and 35 for generating first diffracted beam 31 is not changed even after the movement. The light-use area of hologram areas 34 and 36 for generating second diffracted beam 32 in the same way is unchanged, either. The positional deviation of respective diffracted beams reaching respective elements of photodetector 6 is conducted along the division line. Therefore, since the ratio of quantity of light or area ratio reaching respective elements of photodetector 6 is unchanged to cause no trouble. The foregoing movement of the diffracted beams over photodetector 6 resulting from the changed position of objective lens 4 is illustrated in FIG. 10.

Figure 11:
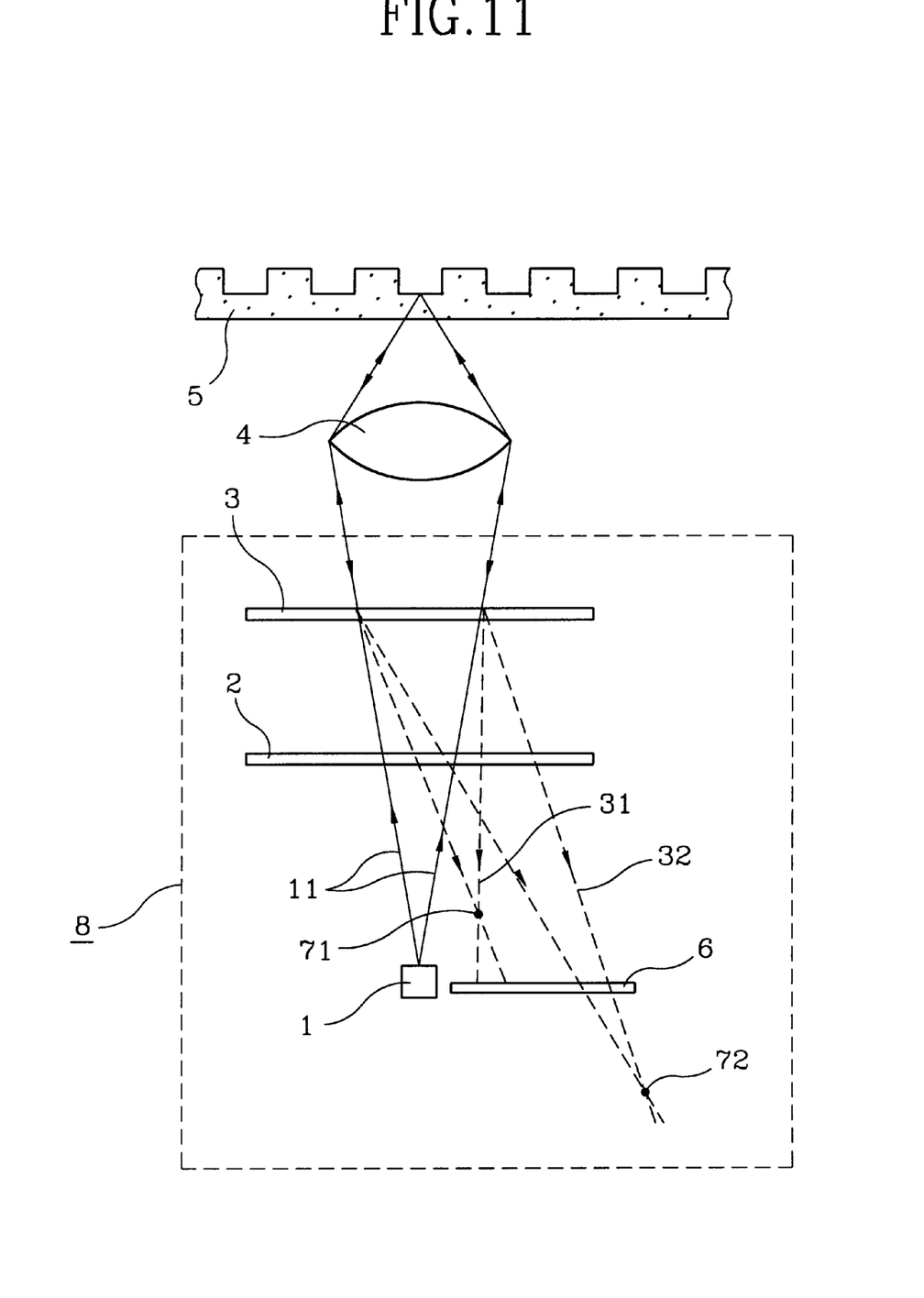
FIG. 11 shows a construction of a hologram head module according to the present invention.

On the other hand, FIG. 11 shows another embodiment of the present invention, in which a hologram head module including the hologram is formed to be installed to the optical pickup device according to the present invention.

Referring to FIG. 11 showing one embodiment of a hologram head module 8, there is provided a light source 1 for emitting an outgoing light toward a recording medium 5, and a diffraction grating 2 for dividing the outgoing light emitted from light source 1 into a main beam and at least two sub-beams. In addition to these, a hologram 3 is formed such that, after being equally divided into $2^{n+1}$ sector areas by a first division line 38 parallel to the train of tracks for dividing the reflected light reflected from recording medium 5 from an outgoing light axis and $2^n$ division lines numbering at least two by including first division line 38, first diffracted beam 31 is diffracted by every other $2^n$ area alternately arranged among the $2^{n+1}$ sector areas and second diffracted beam 32 is diffracted by remaining every other $2^n$ area. Hologram head module 8 further has a photodetector 6 including first light receiving elements 66, 67 and 68 divided by at least three in the direction of the train of tracks for accepting first diffracted beam 31 diffracted from hologram 3 and second light receiving elements 63, 64 and 65 divided by at least three in the direction of the train of tracks for receiving second diffracted beam 32.

An objective lens 4 for focusing the main beam and sub-beams separated by diffraction grating 2 onto recording medium 5 independently from one another is installed between hologram head module 8 and recording medium 5, of which construction is the same as that shown in FIG. 5.

As described above in detail, the optical pickup device according to the present invention employs only one small photodetector to be advantageous of lowering manufacturing cost, unrestraining the designing and involving less change in signal characteristics free from the liable wavelength variation or deviated tracking position of the objective lens, while being easy to be adjusted and presenting stable quality.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device comprising:
   a light source for emitting an outgoing light toward a recording medium;
   a diffraction grating for separating said outgoing light emitted from said light source into a main beam and at least two sub-beams;
   an objective lens for independently focusing said main beam and sub-beams separated via said diffraction grating onto said recording medium;
   a hologram for dividing a reflected light having passed through said objective lens after being reflected by said recording medium into a first diffracted beam and a second diffracted beam having different focusing distances from each other, and diffracting said first and second diffracted beams to one direction of the outgoing light axis of said light source; and
   a single photodetector divided into a plurality of light receiving elements for accepting said first diffracted beam and second diffracted beam and detecting a focus error signal based on said accepted diffracted beams.

2. An optical pickup device as claimed in claim 1, wherein said hologram is comprised to form a focus of said first diffracted beam before reaching said photodetector while being near to said light source and form a focus of said second diffracted beam after passing said photodetector while being distant from said light source.

3. An optical pickup device as claimed in claim 1, wherein said hologram is comprised to form a focus of said first diffracted beam after passing said photodetector while being near to said light source and form a focus of said second diffracted beam before reaching said photodetector while being distant from said light source.

4. An optical pickup device as claimed in claim 2, wherein said hologram has $2^{n+1}$ areas partitioned by $2^n$ division lines going through the center to allow every other $2^n$ area alternately arranged among said $2^{n+1}$ areas to diffract said first diffracted beam 31 and allow remaining every other $2^n$ area alternately arranged therebetween to diffract said second diffracted beam.

5. An optical pickup device as claimed in claim 4, wherein, when a value of said n is set to one, said hologram has four-divided areas divided by a first division line parallel to the train of tracks of said recording medium and a second division line perpendicularly intersecting said train of tracks in such a manner that a pair of diagonally-opposite areas among said four-divided areas diffract said first diffracted beam and the remaining pair of areas diffract said second diffracted beam.

6. An optical pickup device as claimed in claim 1, wherein either one focus between said focuses of said first diffracted beam and second diffracted beam is formed before reaching said photodetector with respect to an optical axis direction, and the other focus is formed after passing said photodetector.

7. An optical pickup device as claimed in claim 6, wherein either one focus between said two focuses is formed near to said light source and the other focus is formed on the relatively distant place.

8. An optical pickup device as claimed in claim 1, wherein said photodetector is placed between the focus of said first diffracted beam and that of said second diffracted beam, and is installed to be perpendicular to said outgoing light axis.

9. An optical pickup device as claimed in claim 8, wherein said photodetector comprises a first light receiving element for accepting said first diffracted beam and a second light receiving element for accepting said second diffracted beam obtained by being bisected by said division line perpendicularly intersecting the direction of said train of track of said recording medium, and said first light receiving element and second light receiving element are respectively formed by at least three light receiving elements which are divided by division lines parallel to said direction of said train of tracks to be arranged in the direction perpendicular to said direction of said train of tracks.

10. An optical pickup device comprising:

a hologram head module including a light source for emitting an outgoing light toward a recording medium, a diffraction grating for separating said outgoing light emitted from said light source into a main beam and at least two sub-beams, a hologram for dividing a reflected light having passed through an objective lens after being reflected by said recording medium into a first diffracted beam and a second diffracted beam having mutually different focusing distances from each other and diffracting said first and second diffracted beams to one direction of the outgoing light axis of said light source, and a photodetector for accepting said first diffracted beam and second diffracted beam to detect a focus error signal; and said objective lens installed between said hologram head module and said recording medium for independently focusing said main beam and sub-beams separated by said diffraction grating onto said recording medium, whereby said hologram head module is rotatable by centering about said outgoing light axis of said light source to facilitate the setting of said main beam and sub-beams to said train of tracks of said recording medium.

11. An optical pickup device as claimed in claim 10, wherein said hologram is comprised to form a focus of said first diffracted beam before reaching said photodetector while being near to said light source and form a focus of said second diffracted beam after passing said photodetector while being distant from said light source.

12. An optical pickup device as claimed in claim 10, wherein said hologram is comprised to form a focus of said first diffracted beam after passing said photodetector while being near to said light source and form a focus of said second diffracted beam before reaching said photodetector while being distant from said light source.

13. An optical pickup device as claimed in claim 1, wherein said hologram has $2^{n+1}$ areas partitioned by $2^n$ division lines going through the center to allow every other $2^n$ area alternately arranged among said $2^{n+1}$ areas to diffract said first diffracted beam 31 and allow remaining every other $2^n$ area alternately arranged therebetween to diffract said second diffracted beam.

14. An optical pickup device as claimed in claim 13, wherein, when a value of said n is set to one, said hologram has four-divided areas divided by a first division line parallel to the train of tracks of said recording medium and a second division line perpendicularly intersecting said train of tracks in such a manner that a pair of diagonally-opposite areas among said four-divided areas diffract said first diffracted beam and the remaining pair of areas diffract said second diffracted beam.

15. An optical pickup device as claimed in claim 10, wherein either one focus between said focuses of said first diffracted beam and second diffracted beam is formed before reaching said photodetector (with respect to an optical axis direction), and the other focus is formed after passing said photodetector.

16. An optical pickup device as claimed in claim 15, wherein either one focus between said two focuses is formed near to said light source and the other focus is formed on the relatively distant place.

17. An optical pickup device as claimed in claim 10, wherein said photodetector is placed between the focus of said first diffracted beam and that of said second diffracted beam, and is installed to be perpendicular to said outgoing light axis.

18. An optical pickup device as claimed in claim 17, wherein said photodetector comprises a first light receiving element for accepting said first diffracted beam and a second light receiving element for accepting said second diffracted beam obtained by being bisected by said division line perpendicularly intersecting the direction of said train of track of said recording medium, and said first light receiving element and second light receiving element are respectively formed by at least three light receiving elements which are divided by division lines parallel to said direction of said train of tracks to be arranged in the direction perpendicular to said direction of said train of tracks.

* * * * *